United States Patent [19]

Miyata et al.

[11] Patent Number: 5,759,509
[45] Date of Patent: Jun. 2, 1998

[54] METAL HYDROXIDE AND OXIDE SOLID SOLUTIONS HAVING HIGH ASPECT RATIOS AND THEIR PROCESSES FOR PRODUCTION

[75] Inventors: Shigeo Miyata, Kitakyushu; Ryuichi Ishibashi, Ako; Atsuya Kawase, Ako; Yasunori Kitano, Ako, all of Japan

[73] Assignee: Tateho Chemical Industries Co., Ltd., Ako, Japan

[21] Appl. No.: 621,377

[22] Filed: Mar. 14, 1996

[30] Foreign Application Priority Data

Mar. 17, 1995 [JP] Japan .................. 7-086410

[51] Int. Cl.$^6$ .......................... C01G 45/12; C01G 49/02; C01G 51/04; C01G 53/04
[52] U.S. Cl. .......................... 423/593; 423/594; 423/599
[58] Field of Search .......................... 423/593, 594, 423/599

[56] References Cited

U.S. PATENT DOCUMENTS

| | | |
|---|---|---|
| 3,803,191 | 4/1974 | Ehrreich et al. .................. 423/594 |
| 5,264,284 | 11/1993 | Miyata . |
| 5,401,442 | 3/1995 | Miyata .................. 423/594 |

FOREIGN PATENT DOCUMENTS

| | | |
|---|---|---|
| 0 498 566 A1 | 8/1992 | European Pat. Off. . |
| 0 517 448 A1 | 12/1992 | European Pat. Off. . |
| 5-112669 | 5/1993 | Japan . |
| 5-209084 | 8/1993 | Japan . |
| 5-255532 | 10/1993 | Japan . |
| 6-41441 | 2/1994 | Japan . |
| 6-87979 | 3/1994 | Japan . |
| 157032 | 6/1994 | Japan .................. 423/594 |
| 6-157032 | 6/1994 | Japan . |
| 7-2518 | 1/1995 | Japan . |

*Primary Examiner*—Wayne Langel
*Attorney, Agent, or Firm*—Armstrong, Westerman Hattori, McLeland & Naughton

[57] ABSTRACT

By hydrating a metal oxide solid solution shown as the following formula (3), wherein an average primary crystal particle diameter is in the range of 1 to 10 μm, in the presence of monocarboxylic acid and/or oxymonocarboxylic acid in aqueous medium, $$Mg_{1-z}M^{2+}_zO \tag{3}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and z is in the range of $0.01 \leq z < 0.5$, a metal hydroxide solid solution having a high aspect ratio shown as the following formula (1) can be obtained;

$$Mg_{1-x}M^{2+}_x(OH)_2 \tag{1}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and x is in the range of $0.01 \leq x < 0.5$, characterized by that a crystal is a hexagonal plate in shape, 0.01 to 0.5 μm in average thickness, 1 to 10 μm in average diameter and not less than 10 in aspect ratio. The metal hydroxide and oxide solid solutions add new functions such as a reinforcing effect on resin, ductility useful for cosmetics and the like and ultraviolet ray absorbancy to functions available for conventional magnesium based metal hydroxide and oxide solid solutions such as a solutions such as a flame-retardant, an acid neutralizer, an acid acceptor for halogen-containing rubber, a thickener for FRP and the like.

5 Claims, No Drawings

METAL HYDROXIDE AND OXIDE SOLID SOLUTIONS HAVING HIGH ASPECT RATIOS AND THEIR PROCESSES FOR PRODUCTION

TECHNICAL FIELD

This invention relates to magnesium based metal hydroxide and oxide solid solutions in which a crystal is a hexagonal plate in shape and has a high aspect ratio, and their processes for production. In detail, it relates to magnesium based metal hydroxide and oxide solid solutions having novel high aspect ratios, which function excellently as a resin reinforcer, a cosmetic base, an ultraviolet ray absorber, a pearl pigment base, a flame-retardant and the like, and their processes for production.

In conventional magnesium based hydroxide and oxide solid solutions (Japanese Provisional Publication Nos. JP6-41441, JP5-209084 and JP6-157032), a crystal is a hexagonal plate or an approximate hexagonal plate in shape. However, the aspect ratio of an average diameter based on an average thickness is less than 10. Moreover, the average diameter is less than 1 μm.

BACKGROUND OF THE INVENTION

In conventional magnesium based hydroxide and oxide solid solutions, a crystal size is small and an aspect ratio is small. Therefore, they cannot exhibit sufficiently the same reinforcing effects on resin as mica or talc. Namely, their reinforcing effects on strength properties such as flexural strength and modulus of flexural elasticity are low. In addition, they cannot exhibit preferable ductility as a cosmetic and the like to a satisfying level.

SUMMARY OF THE INVENTION

Under these circumstances, it is an object of this invention to add new functions such as a reinforcing effect on resin, ductility useful for cosmetics and the like and ultraviolet ray absorbancy to functions available for conventional magnesium based metal hydroxide and oxide solid solutions such as a flame-retardant, an acid neutralizer, an acid acceptor for halogen-containing rubber, a thickener for fiber-reinforced plastics (just abbreviated to "FRP" hereinafter) and the like.

To accomplish the above object, a first gist of the invention relates to a metal hydroxide solid solution having a high aspect ratio shown as the following formula (1).

$$Mg_{1-x}M^{2+}{}_x(OH)_2 \tag{1}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and x is in the range of $0.01 \leq x<0.5$, preferably $0.1 \leq x<0.3$, characterized by that a crystal is a hexagonal plate in shape, 0.01 to 0.5 μm in average thickness, 1 to 10 μm in average diameter and not less than 10, preferably not less than 15, in aspect ratio.

A second gist of the invention relates to a metal oxide solid solution having a high aspect ratio shown as the following formula (2).

$$Mg_{1-y}M^{2+}{}_yO \tag{2}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and y is in the range of $0.01 \leq y<0.5$, preferably $0.1 \leq y<0.3$, characterized by that a crystal is a hexagonal plate in shape, 0.01 to 0.5 μm in average thickness, 1 to 10 μm in average diameter and not less than 10, preferably not less than 15, in aspect ratio.

A third gist of the invention relates to a process for producing the metal hydroxide solid solution comprising hydrating a metal oxide solid solution shown as the following formula (3), wherein an average primary crystal particle diameter is in the range of 2 to 10 μm, in the presence of monocarboxylic acid and/or oxymonocarboxylic acid in aqueous medium,

$$Mg_{1-z}M^{2+}{}_zO \tag{3}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and z is in the range of $0.01 \leq z<0.5$, preferably $0.1 \leq z<0.3$.

A fourth gist of the invention relates to a process for producing the metal oxide solid solution by calcining the metal hydroxide solid solution at not less than 400° C., preferably 500° to 1,200° C.

Now, the present invention is described in detail.

In the magnesium based hydroxide solid solution having a high aspect ratio of the present invention, which shows the same crystal structure as that of $Mg(OH)_2$, a divalent metal ion represented as $M^{2+}$ in the formula (1) forms solid solution in $Mg(OH)_2$. In case of the magnesium based oxide solid solution of the present invention, which shows the same crystal structure as that of MgO, a divalent metal ion represented as $M^{2+}$ in the formula (2) forms solid solution in MgO, similar to the above hydroxide.

$M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$. Among all, $Zn^{2+}$ is the most preferable. When being solid-solved in $Mg(OH)_2$ or MgO, $Zn^{2+}$ has advantages that whiteness degree is improved and also ultraviolet ray absorbancy is imparted to such solid solutions.

The average crystal thickness of the magnesium based metal hydroxide and oxide solid solutions having high aspect ratios according to the present invention is in the range of 0.01 to 0.5 μm, preferably 0.01 to 0.2 μm, more preferably 0.02 to 0.1 μm. The average crystal diameter is in the range of about 1 to 10 μm, especially preferably in the range of about 2 to 5 μm. The aspect ratios of the metal hydroxide and oxide solid solutions are not less than 10, preferably not less than 15.

Now, a process for production of the metal hydroxide solid solution having a high aspect ratio of the present invention is described in detail. Alkali such as NaOH, $Ca(OH)_2$ or the like is added into a mixture solution of $Mg^{2+}$ and salts of $M^{2+}$ for coprecipitation so that composite metal hydroxide can be obtained. After the composite metal hydroxide is washed with water and dried, it is calcined at about 1,000° C. to 2,000° C., preferably 1,100° C. to 1,500° C. As a result, a metal oxide solid solution, wherein an average primary crystal particle diameter is in the range of 1 to 10 μm, represented as the following formula (3)

$$Mg_{1-z}M^{2+}{}_zO \tag{3}$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and z is in the range of $0.01 \leq z<0.5$, preferably $0.1 \leq z<0.3$, can be obtained. This metal oxide solid solution is crushed to not more than 10 μm in particle diameter. Then, this is hydrated with stirring in the presence of monocarboxylic acid and/or oxymonocarboxylic acid in aqueous medium, preferably at not more than about 100° C. The metal hydroxide solid solution represented as the formula (1) can be obtained thereby. It is more preferable to use oxymonocarboxylic acid as organic acid for hydration. Its amount is in the range of about 0.01 to 0.2 mol/l. The amount of oxide added at that time is in the range of about 1 to 100 g/l.

As monocarboxylic acid and oxymonocarboxylic acid, formic acid, acetic acid, propionic acid, butyric acid, valeric acid, caproic acid, acrylic acid and crotonic acid are enumerated for a monocarboxylic acid, and glycolic acid, lactic acid, hydroacrylic acid, α-oxybutyric acid, glyceric acid, salicylic acid, benzoic acid, gallic acid and the like are enumerated for oxymonocarboxylic acid.

The metal oxide solid solution having a high aspect ratio of the present invention can be produced by calcining the metal hydroxide solid solution having a high aspect ratio, obtained by the above-mentioned process, at not less than about 400° C., preferably about 500° to 1.200° C.

By conducting a various kinds of conventional surface treatments on the solid solution having a high aspect ratio of the present invention, affinity for resin, acid resistance, ultraviolet ray absorbancy and the like can be improved.

As a surface treatment agent, the following are enumerated. To improve affinity for resin, there are higher fatty acid, or its alkali metal salt, phosphoric esters, coupling agents of silane, titanate or aluminium type, fatty acid esters of polyhydric alcohol and the like. To improve acid resistance, water repellency and the like, there are silica coating by hydrolysis of methyl silicate or ethyl silicate, silicate metallic salt coating by calcining at about 500° C. to 1.000° C. after silica coating and coating by silicone oil, polyfluoroalkyl phosphate and the like. To strengthen ultraviolet ray absorbancy, there are surface treatments by titanium dioxide by hydrolyzing titanyl sulfate and the like.

EFFECTS OF THE INVENTION

The present invention can provide novel metal hydroxide and oxide solid solutions having high aspect ratios characterized by that a crystal is a hexagonal plate in shape, 0.01 to 0.5 μm in average thickness, 1 to 10 μm in average diameter and not less than 10 in aspect ratio, and processes for producing thereof. The metal hydroxide and oxide solid solutions add new functions such as a reinforcing effect on resin, ductility useful for cosmetics and the like and ultraviolet ray absorbancy to functions available for conventional magnesium based metal hydroxide and oxide solid solutions such as a flame-retardant, an acid neutralizer, an acid acceptor for halogen-containing rubber, a thickener for FRP and the like.

The present invention will be now further described by reference to the following Examples.

EXAMPLE 1

First, 5 liters of a mixture solution of magnesium nitrate and zinc nitrate ($Mg^{2+}=1.6$ mol/l, $Zn^{2+}=0.4$ mol/l) was put into a 20-liter container. Then, 5 liters of sodium hydroxide solution (4.0 mol/l) was added therein to be reacted with stirring. Thus obtained white precipitation was filtrated under reduced pressure, washed with water and dried. After this dried material was crushed in a mortar, it was calcined by a kanthal furnace at 1.200° C. for 2 hours. After this calcined material was crushed in a mortar and passed through a 100-mesh sieve, it was added into a 50-liter container, into which 30 liters of acetic acid (0.05 mol/l) had been put preliminarily, so as to be hydrated with stirring at 90° C. for 8 hours. This reactant was sieved by a 200-mesh sieve, filtrated under reduced pressure, washed with water and dried. A powder x-ray diffraction pattern of thus obtained dried material was measured. The same x-ray diffraction pattern as that of magnesium hydroxide was shown except that it shifted to a low-angle side slightly. It is found out that $Zn(OH)_2$ was solid solved into $Mg(OH)_2$, accordingly. As a result of the observation by a scanning electron microscope, the average crystal thickness was about 0.12 μm and the average diameter was about 2.4 μm. Thus, the aspect ratio was 20. The BET specific surface area was 2.4 $m^2/g$.

EXAMPLE 2

The dried material was obtained in the same way as that of EXAMPLE 1 except that a mixture solution of magnesium nitrate, zinc nitrate and cupric nitrate ($Mg^{2+}=1.6$ mol/l, $Zn^{2+}=0.3$ mol/l and $Cu^{2+}=0.1$ mol/l) was employed. The x-ray diffraction pattern of thus obtained dried material was the same as that of magnesium hydroxide except that it shifted to a low-angle side slightly. It is found out that $Zn(OH)_2$ and $Cu(OH)_2$ were solid solved into $Mg(OH)_2$, accordingly. As a result of the observation by a scanning electron microscope, the average crystal thickness was about 0.08 μm and the average diameter was about 1.7 μm. Thus, the aspect ratio was 21. The BET specific surface area was 2.6 $m^2/g$.

EXAMPLE 3

The same materials as those of EXAMPLE 1 were employed and processed in the same way as EXAMPLE 1, and then were calcined and crushed. This calcined and crushed material was added into 30 liters of a mixture solution of 0.05 mol/l acetic acid and 0.02 mol/l lactic acid and was processed in the same way as EXAMPLE 1 and then hydration and the subsequent treatments were conducted. The x-ray diffraction pattern of thus obtained dried material was the same as that of EXAMPLE 1. It is found out that $Zn(OH)_2$ was solid solved into $Mg(OH)_2$, accordingly. As a result of the observation by a scanning electron microscope, the average crystal thickness was about 0.07 μm and the average diameter was about 4.1 μm. Thus, the aspect ratio was 59. The BET specific surface area was 6.0 $m^2/g$.

EXAMPLE 4

The hydroxide solid solution having a high aspect ratio obtained by EXAMPLE 3 was calcined at 800° C. for 2 hours in an electric furnace. The x-ray diffraction pattern of powder thereof was the same as that of magnesium oxide except that it shifted to a low-angle side slightly. It is found out that ZnO was solid solved into MgO, accordingly. As a result of the observation by a scanning electron microscope, the average crystal thickness was about 0.06 μm and the average diameter was about 4.0 μm. Thus, the aspect ratio was 67. The BET specific surface area was 15 $m^2/g$.

COMPARATIVE EXAMPLE 1

First, 5 liters of a mixture solution of magnesium nitrate and zinc nitrate ($Mg^{2+}=1.6$ mol/l, $Zn^{2+}=0.4$ mol/l) was put into a 20-liter container. Then, 5 liter of sodium hydroxide solution (4.0 mol/l) was added therein to be reacted with stirring. Thus obtained resultant slurry was put into an autoclave for a hydrothermal treatment at 170° C. for 4 hours. Subsequently, it was filtrated, washed with water and dried. The x-ray diffraction pattern of thus obtained dried powder was $Mg(OH)_2$ and a trace impurity of ZnO. As a result of the observation by a scanning electron microscope, the average crystal thickness was about 0.15 µm and the average diameter was about 0.5 µm. Thus, the aspect ratio was 3.3. The BET specific surface area was 12 m²/g.

COMPARATIVE EXAMPLE 2

The reactant was obtained in the same way as that of COMPARATIVE EXAMPLE 1 except that a mixture solution of magnesium nitrate, zinc nitrate and cupric nitrate ($Mg^{2+}$=1.6 mol/l, $Zn^{2+}$=0.3 mol/l and $Cu^{2+}$=0.1 mol/l) was employed. Thus obtained resultant slurry was filtrated, washed with water and dried. The x-ray diffraction pattern of thus obtained dried powder showed $Mg(OH)_2$ only. As a result of the observation by a scanning electron microscope, the average crystal thickness was about 0.02 µm and the average diameter was about 0.1 µm. Thus, the aspect ratio was 5. The BET specific surface area was 46 m²/g.

What is claimed is:

1. A metal hydroxide solid solution having a high aspect ratio comprising a metal hydroxide solid solution shown as the following formula (1), $$Mg_{1-x}M^{2+}_x(OH)_2 \qquad (1)$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and x is in the range of $0.01 \leq x < 0.5$, wherein a crystal of the metal hydroxide solid solution is a hexagonal plate in shape, 0.01 to 0.5 µm in average thickness, 1 to 10 µm in average diameter and not less than 10 in aspect ratio.

2. A metal oxide solid solution having a high aspect ratio comprising a metal oxide solid solution shown as the following formula (2), $$Mg_{1-y}M^{2+}_y O \qquad (2)$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and y is in the range of $0.01 \leq y < 0.5$, wherein a crystal of the metal oxide solid solution is a hexagonal plate in shape, 0.01 to 0.5 µm in average thickness, 1 to 10 µm in average diameter and not less than 10 in aspect ratio.

3. A metal hydroxide or oxide solid solution according to claim 1 or 2 wherein $M^{2+}$ of the formula (1) or (2) is $Zn^{2+}$.

4. A process for producing a metal oxide solid solution according to claim 2 comprising calcining a metal hydroxide solid solution according to claim 1 at not less than 400° C.

5. A process for producing a metal hydroxide solid solution having a high aspect ratio comprising a metal hydroxide solid solution shown as the following formula (1), $$Mg_{1-x}M^{2+}_x(OH)_2 \qquad (1)$$

in which $M^{2+}$ represents at least one divalent metal ion selected from the group consisting of $Mn^{2+}$, $Fe^{2+}$, $Co^{2+}$, $Ni^{2+}$, $Cu^{2+}$, and $Zn^{2+}$ and x is in the range of $0.01 \leq x < 0.5$, wherein a crystal of the metal hydroxide solid solution is a hexagonal plate in shape, 0.01 to 0.5 µm in average thickness, 1 to 10 µm in average diameter and not less than 10 in aspect ratio comprising preparing a metal oxide solid solution wherein an average primary crystal particle diameter is in the range of 1 to 10 µm, shown as the following formula (3) and hydrating the metal oxide solid solution, in the presence of monocarboxylic acid and/or oxymonocarboxylic acid in aqueous medium, $$Mg_{1-z}M^{2+}_z O \qquad (3)$$

in which $M^{2+}$ represents at least one divalent metal ion selected from the group consisting of $Mn^{2+}$, $Fe^{2+}$, $Co^{2+}$, $Ni^{2+}$, $Cu^{2+}$ and $Zn^{2+}$, and z is in the range of $0.01 \leq z < 0.5$.

* * * * *